United States Patent
Zabel et al.

(10) Patent No.: US 9,976,896 B2
(45) Date of Patent: *May 22, 2018

(54) UTILIZING A QUENCH TIME TO DEIONIZE AN ULTRAVIOLET (UV) SENSOR TUBE

(71) Applicant: Honeywell International Inc., Morris Plains, NJ (US)

(72) Inventors: Brian Zabel, Yorktown, IN (US); Chad Carty, Nobelsville, IN (US); Barrett E. Cole, Bloomington, MN (US)

(73) Assignee: Honeywell International Inc., Morris Plains, NJ (US)

( * ) Notice: Subject to any disclaimer, the term of this patent is extended or adjusted under 35 U.S.C. 154(b) by 13 days.

This patent is subject to a terminal disclaimer.

(21) Appl. No.: 15/209,320

(22) Filed: Jul. 13, 2016

(65) Prior Publication Data
US 2016/0334271 A1 Nov. 17, 2016

Related U.S. Application Data (63) Continuation of application No. 14/711,435, filed on May 13, 2015, now Pat. No. 9,417,124.

(51) Int. Cl.
*G01J 1/42* (2006.01)
*G01J 1/44* (2006.01)
(Continued)

(52) U.S. Cl.
CPC ............ *G01J 1/429* (2013.01); *G01J 1/0228* (2013.01); *G01J 1/4228* (2013.01); *G01J 1/44* (2013.01);
(Continued)

(58) Field of Classification Search
CPC ............ F23N 2029/16; F23N 2027/12; F23N 2029/04; G01J 1/429; G01J 1/0228;
(Continued)

(56) References Cited

U.S. PATENT DOCUMENTS 3,683,372 A * 8/1972 Horn ...................... G08B 17/12
340/515
4,202,318 A * 5/1980 DePodesta ................ F24H 3/06
126/110 E
(Continued)

FOREIGN PATENT DOCUMENTS

| JP | H0501281 A | 1/1993 |
| JP | 2004037096 A | 2/2004 |
| JP | 2013134539 A | 7/2013 |

OTHER PUBLICATIONS

International Search Report and Written Opinion from related PCT Application No. PCT/US2016/029420, dated Aug. 10, 2016, 9 pp.
(Continued)

*Primary Examiner* — Taeho Jo
(74) *Attorney, Agent, or Firm* — Brooks, Cameron & Huebsch, PLLC (57) ABSTRACT

Utilizing a quench time to deionize an ultraviolet (UV) sensor tube are described herein. One method includes monitoring firing events within a UV sensor tube, where a particular firing event initiates arming the UV sensor tube, initiating a quench time to deionize the UV sensor tube, where the quench time includes, disarming the UV sensor tube to prevent a firing event.

20 Claims, 5 Drawing Sheets

(51) Int. Cl.
*G01J 1/02* (2006.01)
*G01J 5/00* (2006.01)

(52) U.S. Cl.
CPC ....... *G01J 5/0018* (2013.01); *G01J 2001/444* (2013.01); *G01J 2001/4446* (2013.01)

(58) Field of Classification Search
CPC ...... G01J 1/4228; G01J 1/44; G01J 2001/444; G01J 2001/4446; G01J 5/0018
USPC ......................................................... 250/372
See application file for complete search history.

(56) References Cited

U.S. PATENT DOCUMENTS

| | | | |
|---|---|---|---|
| 4,280,184 A | 7/1981 | Weiner | |
| 4,578,583 A * | 3/1986 | Ciammaichella | G01J 1/429 250/370.12 |
| 4,823,114 A * | 4/1989 | Gotisar | F23N 5/082 340/578 |
| 4,882,573 A * | 11/1989 | Leonard | F23N 5/082 340/578 |
| 5,123,836 A * | 6/1992 | Yoneda | F23G 5/50 110/215 |
| 5,256,057 A * | 10/1993 | Grow | F23N 5/082 431/25 |
| 6,168,419 B1 * | 1/2001 | Mindermann | F23N 5/082 340/578 |
| 6,261,086 B1 * | 7/2001 | Fu | F23N 5/082 250/554 |
| 6,472,669 B1 * | 10/2002 | Chase | F23N 5/082 250/372 |
| 7,088,253 B2 | 8/2006 | Grow | |
| 9,417,124 B1 * | 8/2016 | Zabel | G01J 1/429 |
| 2003/0141979 A1 * | 7/2003 | Wild | F23N 5/00 340/577 |
| 2005/0174244 A1 * | 8/2005 | Grow | F23N 5/082 340/577 |
| 2005/0247883 A1 * | 11/2005 | Burnette | G01J 1/429 250/372 |
| 2006/0049361 A1 * | 3/2006 | Allsworth | F23N 5/082 250/372 |
| 2007/0019361 A1 * | 1/2007 | Obrecht | F23N 5/123 361/247 |
| 2009/0072737 A1 * | 3/2009 | Cole | F23N 5/082 313/539 |
| 2009/0120338 A1 * | 5/2009 | Adendorff | C03B 5/235 110/345 |
| 2010/0013644 A1 * | 1/2010 | McDonald | F23N 5/123 340/577 |
| 2012/0138809 A1 * | 6/2012 | Mindermann | F23N 5/082 250/372 |

OTHER PUBLICATIONS

Scot Lester. Flash-capacitor IC Powers Portable UV Flame Detector. EE Times. Jul. 21, 2006. 4 pages.

* cited by examiner

UTILIZING A QUENCH TIME TO DEIONIZE AN ULTRAVIOLET (UV) SENSOR TUBE

PRIORITY INFORMATION

This application is a continuation of U.S. application Ser. No. 14/711,435, filed May 13, 2015, the entire specification of which is incorporated herein by reference.

TECHNICAL FIELD

The present disclosure relates to utilizing a quench time to deionize an ultraviolet (UV) sensor tube.

BACKGROUND

Flames, such as from burners, typically radiate ultraviolet (UV) emissions (e.g., radiation, light). Ultraviolet (UV) sensors can be used to detect the presence of UV emissions, and thereby detect the presence of a flame. Using a UV sensor to determine whether a flame is burning or extinguished can assist in safety precautions when using applications that involve flames. For example, UV sensors may be utilized to detect the presence of UV radiation emanating from a flame in a burner. Detecting the presence of a flame inside a burner can help a user (e.g., technician and/or maintenance personnel) safely operate and/or service the burner.

A UV sensor can be within a UV sensor tube, which can be an ultraviolet sensitive, cold cathode, discharge tube. The cathode can emit electrons when exposed to the UV radiation (e.g., emissions from flame from a burner). However, UV sensor tubes can age quickly with use, causing decreased sensitivity and/or unreliable readings. An aged UV sensor tube may not properly sense UV emissions (e.g., radiation) and/or may provide inconsistent sensitivity over time. For example, the UV sensor may become desensitized to low levels of UV emissions over time.

An aged UV sensor tube can affect reliability and safety associated with the UV sensor, which can lead to dangerous operating conditions for a product application, such as a burner, containing the UV sensor. Therefore, it is important to maintain or increase the UV sensor tube life to maintain reliability and consistent sensitivity over a period of time.

DETAILED DESCRIPTION

Methods, systems, and devices for utilizing a quench time to deionize a UV sensor tube are described herein. For example, one or more embodiments can include monitoring firing events within a UV sensor tube, where a particular firing event initiates arming the UV sensor tube, initiating a quench time to deionize the UV sensor tube, where the quench time includes, disarming the UV sensor tube to prevent a firing event.

Utilizing a quench time to deionize a UV sensor tube, in accordance with the present disclosure, can reduce or eliminate potential damage to a UV sensor tube during a tube discharge cycle by deionizing the UV sensor tube between firing cycles. Reduction and/or elimination of damage to the UV sensor tube can reduce aging of the UV sensor tube. A reduction in UV sensor tube aging can prolong the life (e.g., timespan) of the UV sensor, and/or provide reliability and/or safer operation of product applications (e.g., burners) utilizing the UV sensors. For example, reducing UV sensor tube aging can maintain reliability while delaying UV sensor replacement.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 210 may reference a controller (e.g., element "10") in FIG. 2, and the controller may be reference as 310 (e.g., similar reference) in FIG. 3.

As used herein, "a" or "a number of" something can refer to one or more such things. For example, "a number of UV sensors" can refer to one or more UV sensors.

Figure 1:
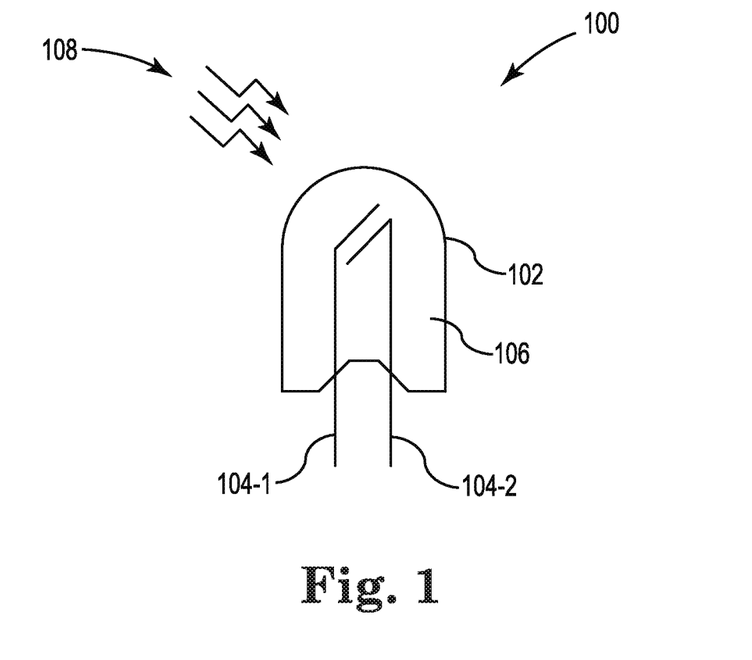
FIG. 1 illustrates an example of a UV sensor device in accordance with one or more embodiments of the present disclosure.

FIG. 1 illustrates an example of a UV sensor device in accordance with one or more embodiments of the present disclosure. As shown in FIG. 1, a UV sensor 100 can include a UV sensor tube 102, electrodes 104-1 and 104-2, and a fill-gas composition 106.

The UV sensor 100 can be a sensor designed to detect the presence of ultraviolet (UV) radiation emissions (e.g., radiation, light). UV radiation can include electromagnetic radiation with a wavelength that can range from 10 nanometers (nm) to 400 nm. For example, UV sensor 100 can be configured to detect the presence of UV radiation within a wavelength range of 10 nm to 400 nm.

The UV sensor tube 102, as used herein, can be a housing that includes a fill-gas composition 106 and electrodes 104-1 and 104-2. In some embodiments, the UV sensor tube 102 can be a housing formed from material to allow the penetration of UV emissions 108, such as a UV radiation from a burner flame, into UV sensor tube 102. For instance, the UV sensor tube can be made of a glass material. In some embodiments, the UV sensor tube 102 can be an insulator and/or a conductor. That is, the UV sensor tube 102 can act as the insulator and/or a conductor during the firing event.

The fill-gas composition 106 within the UV sensor tube 102 can be a composition of one or more gases to allow for the detection of UV events by UV sensor 100. The fill-gas within the UV sensor tube 102 can be ionized by a UV emission from a flame, as discussed further herein (e.g., in association with FIG. 3). Additionally, the fill-gas composition 106 can be a volume to induce a certain pressure within UV sensor tube 102 to allow for detection of UV emissions by the UV sensor 100.

UV tube 102 can include electrodes 104-1 and 104-2. In some embodiments, electrodes 104-1 and 104-2 can be placed within UV tube 102 at a specified distance to assist in the detection of UV emissions by UV sensor 100. The electrodes 104-1 and 104-2 can include an anode lead and a cathode lead. In some examples, a high voltage can be placed across the two electrodes, creating a high impedance between the anode and cathode. In some embodiments, when a particular UV emission enters the UV sensor tube 102 housing, the fill-gas within the UV sensor tube 102 can be ionized, as discussed further herein (e.g., in association with FIG. 3).

Signs a UV sensor 100 may be aging can include reduced pressure of fill-gas composition 106 or a change in the spacing of the electrodes 104-1 and 104-2. For instance, a change in the spacing of the electrodes 104-1 and 104-2 can lead to a change in a firing event at a conduction event within the UV sensor tube 102, which can lead to the UV sensor 100 aging. A firing event can be an excitation voltage within the UV sensor tube. The aging of the UV sensor can cause it to become unreliable or fail to detect UV emissions (e.g., from a flame).

Figure 2:
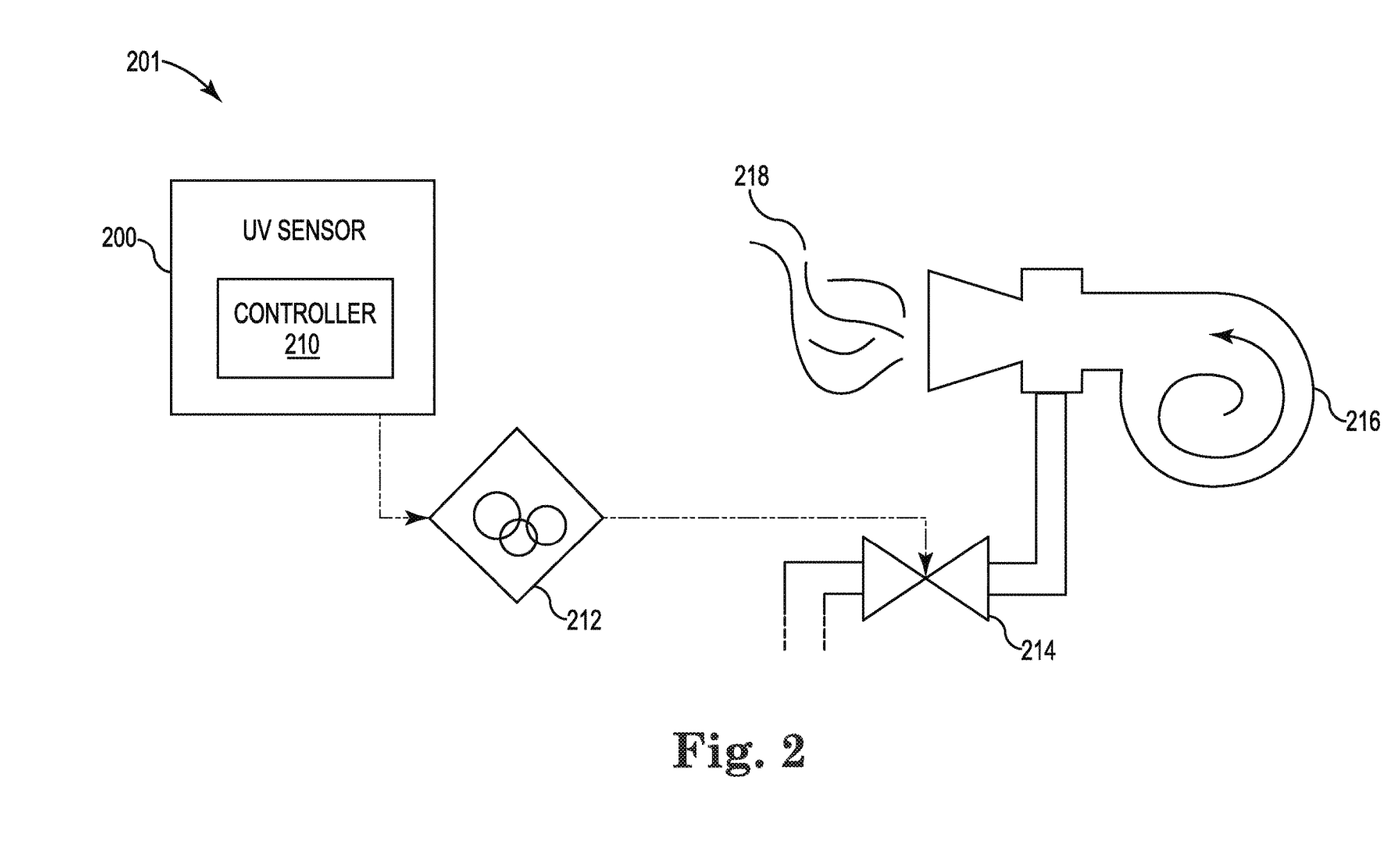
FIG. 2 illustrates an example of a system for utilizing a quench time to deionize a UV sensor tube in accordance with one or more embodiments of the present disclosure.

To prevent premature aging of the UV sensor 100, a quench time can be utilized to prevent firing events within the UV sensor tube 102 to deionize the UV sensor tube, as discussed further herein (e.g., in association with FIG. 2).

FIG. 2 illustrates an example of a system for utilizing a quench time in accordance with one or more embodiments of the present disclosure. As shown in FIG. 2, the system 201 includes a controller 210 and a UV sensor 200. The UV sensor 200 can be the same or similar to the UV sensor as described in FIG. 1. Additionally, system 201 can include a burner 216, a shut-off valve 214, a burner management system 212, and a flame 218. The UV sensor 200 can be used to detect the presence of a flame 218 by detecting UV emissions emitted from the flame 218.

In some embodiments, a number of UV sensor tubes can be configured to detect UV emissions. That is, an application utilizing UV sensors can include a plurality of UV sensor tubes, each of the UV sensor tubes can detect UV emissions, such as from a flame.

In some embodiments, burner 216 can be a fuel-air or fuel-oxygen burner to produce (e.g., generate) a flame 218. For example, burner 216 can be used to produce flame 218 to generate heat for use in residential and/or commercial hot water boiler/heater applications. However, embodiments of the present disclosure are not so limited. For instance, burner 216 can be used for any other suitable application.

In some embodiments, the flame 218 can be a flame produced by burner 216 that emits UV radiation that can be sensed by the UV sensor 200. For example, flame 218 can emit electromagnetic radiation in the wavelength defined by UV (e.g., 10 nm to 400 nm) that can be sensed by UV sensor 200.

In some embodiments, shut-off valve 214 can be a fuel safety shut-off valve for burner 216. For example, if UV sensor 200 does not detect any UV emissions (e.g., does not detect the presence of flame 218), shut-off valve 103 can turn off the flow of fuel into burner 216, preventing the buildup of unburnt fuel in burner 216. As another example, if UV sensor 200 is determined to have failed, shut-off valve 214 can turn off the flow of fuel into burner 216.

In some embodiments, burner management system 212 can control various aspects of the operation of burner 216. For example, burner management system 212 can change the firing rate of burner 216 to produce a more intense flame 218 or a less intense flame 218 based on the required heat output of burner 216. As another example, burner management system 212 can turn burner 216 on and off.

The use of the UV sensor 200 in an application utilizing flame can render an operation of an application safer. In some embodiments, if UV sensor 200 is utilized in an application utilizing a burner, UV sensor 200 can determine that a flame within the burner has been quenched due to UV events (e.g., UV emissions) not being detected by UV sensor 200. Quenching, as used herein, refers to an extinguished flame and/or ceasing of a conduction event. That is, firings (e.g., ionization within the UV sensor tube) can be ceased such that the UV sensor tube can deionize and prepare for future firing events.

In some embodiments, a user, such as a technician and/or maintenance personnel, can shut down the burner in response to UV sensor 200 not detecting UV events to stop the flow of fuel into the burner when there is no flame to prevent the buildup of unburnt fuel and/or other associated problems, such as explosions.

In some embodiments, the controller 210 can receive a detected UV emission signal from the UV sensor 200. The detected UV emission signal can trigger a first firing within the UV sensor tube. Triggering a first firing can cause conduction and ionization of the gas-filled composition.

The controller 210, in some embodiments, can switch off a firing event (e.g., an excitation voltage) within the UV sensor 200 on command. For example, the controller 210 can reduce a firing event and/or excitation voltage of UV sensor 200 until no conduction occurs and/or conduction ceases within the UV sensor 200. In some embodiments, the firing event and/or excitation voltage originates from a UV emission from a flame (e.g., flame 218).

Upon switching off the firing event (e.g., excitation voltage) within the UV sensor 200, controller 210 can utilize a quench time for the UV sensor 200 to deionize the UV sensor tube. The quench time can decrease the firing event (e.g., excitation voltage) within the UV sensor tube for deionization within the sensor tube. The quench time deionization within the UV sensor tube can dissipate ions within the UV sensor tube housing. That is, the controller can prevent firings within the UV sensor tube to allow the UV sensor tube to deionize. For example, the controller can disarm the trap such that a firing event (e.g., excitation voltage) within the UV sensor 200 does not occur, thus preventing a conduction event.

In some embodiments, the quench time can hold the UV sensor tube in a disarmed state to reset, rearm, and deionize. Once the quench time passes, the controller can rearm the UV sensor tube, permitting a conduction event to occur.

A conduction event can be defined by a first instance of conduction in UV sensor 200 as the firing event (e.g., excitation voltage) of UV sensor 200 is increased from a non-conducting state when UV sensor 200 is in the presence of UV emissions. For example, as the excitation voltage of UV sensor 200 is increased, a conduction event occurs at the moment UV sensor 200 first begins to conduct. That is, at the moment the UV sensor 200 first begins to detect UV emissions.

In some embodiments, the quench time is static and does not change during a lifespan of the sensor tube. That is, regardless of the voltage sent to the UV sensor, the quench time can remain the same. For example, if a voltage setpoint (as discussed further in relation to FIG. 3) is set at a predetermined voltage, the quench time can remain static.

Alternatively, in some embodiments, the quench time can be increased or decreased based on a deionization period associated with the UV sensor tube. That is, the quench time can be adjusted based on a predicted level of deionization. For example, a high voltage sent to the UV sensor may increase the quench time due to increased ionization. In some other examples, a low voltage sent to the UV sensor may decrease the quench time due to decreased ionization.

In some embodiments, the controller 210 can disarm the UV sensor tube to prevent a second firing event within the UV sensor tube during the quench time. The controller 210, in some embodiments, can initiate the quench time based, at least in part, on a first firing event and the detected UV emissions. Initiating the quench time can prevent the second firing event within the UV sensor tube. The quench time can decrease conduction and/or firings within the UV sensor tube, which can allow the UV sensor tube to deionize, as discussed further in relation to FIG. 3.

Once the UV sensor tube is deionizeed, in some embodiments the controller 210 can permit the triggering of a third firing event. That is, upon detection of UV emissions by the UV sensor 200, a third firing event can be triggered to cause a surge of electrons and/or increases conduction within the UV sensor tube, as discussed further in relation to FIG. 3.

Figure 3:
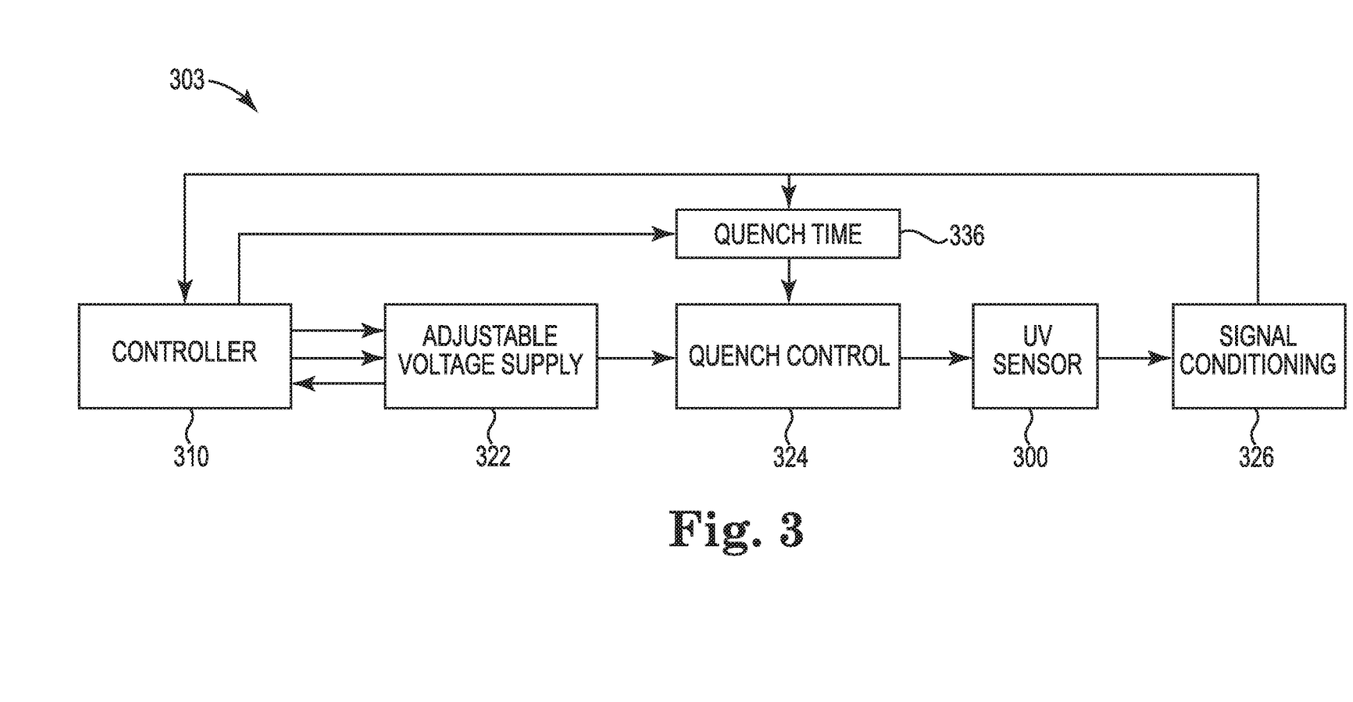
FIG. 3 illustrates a system for utilizing a quench time to deionize a UV sensor tube in accordance with one or more embodiments of the present disclosure

FIG. 3 illustrates an example of a system 303 for utilizing a quench time in accordance with one or more embodiments of the present disclosure. In some embodiments, the system 303 for utilizing a quench time to deionize a UV sensor tube can include a controller 310. Controller 310 can be, for example, controller 210 previously described in connection with FIG. 2.

The controller 310 can enable and/or designate a set point for an adjustable voltage supply. The setpoint voltage can be a voltage at which a UV sensor (e.g., UV sensor 300) conducts. In some embodiments, the controller 310 can initiate a quench time 336 to deionize a UV sensor tube.

The adjustable voltage supply 322 can provide voltage, such as voltage of 30-350V DC, across the electrodes within a UV sensor 300, creating a high impedance between the electrodes. When a photon of UV emission with a particular wavelength enters the UV sensor tube associated with a UV sensor 300, it ionizes the fill-gas composition within the UV sensor tube.

In some embodiments, once the gas is ionized, the impedance between the electrodes can decrease to nearly 0, which can cause a large current to flow from the adjustable voltage supply 322 through the UV sensor tube associated with UV sensor 300. Once ionized, the UV sensor tube can conduct a current until the voltage supply is deionized (e.g., removed) from the UV sensor tube and the arc can be quenched.

In some embodiments, a quench time 336 can be initiated prior to the maximum power rate associated with a UV sensor tube being exceeded. Exceeding the maximum power rate associated with the UV sensor can cause damage to the UV sensor tube. Thus, by utilizing a quench time, damage to the UV sensor tube can be decreased and/or prevented. In some embodiments, the controller 310 can instruct the adjustable voltage to decrease a voltage delivered to the UV sensor 300 based on feedback from adjustable voltage supply 322, which can increase ionization within the UV sensor tube.

In some embodiments, a quench time 336 can be initiated based, at least in part, on a level of deionization associated with the UV sensor tube. That is, the quench time can be increased and/or decreased based on a predicted level of deionization associated with the UV sensor tube. For example, a high voltage supply can increase a quench time to allow for increased deionization within the UV sensor tube.

During the quench time, the UV sensor can be disarmed (e.g., firing event/excitation voltage set near or at zero), preventing an additional (e.g., a second) firing event by impeding a trap associated with the UV sensor. In some embodiments, a voltage level within the sensor tube can be decreased upon detection of an additional firing event. For instance, the quench time can set the firing event (e.g., excitation voltage) within the UV sensor tube to zero for the predetermined period of time. That is, the quench time can include a zero voltage within the UV sensor tube for a fixed period of time, and the fixed period of time can be based on a level of deionization.

In some instances, the quench time 336 can reset and rearm the UV sensor to prepare for an additional firing event once the UV sensor tube has deionized.

In some embodiments, the quench time 336 can include signal conditioning 326. The UV sensor 300 can send a signal to initiate signal conditioning 326 to maintain reliability. In some examples, the signal conditioning 326 improves accuracy of detected UV emissions.

Utilizing a quench time, as discussed herein, can prolong the life of a UV sensor tube. The circuitry driving the UV sensor tube can be capable of detecting minute voltage currents. For example, low voltage current may be detected which forms little to no plasma within the UV sensor tube. In some embodiments, a UV sensor tube without an amplifying fill-gas composition may be used, which can simplify manufacture.

A controller 310 (e.g., a microprocessor) can modify and/or cease current flow once UV emission detection is completed. The controller can initiate a quench time to deionize the UV sensor tube.

Figure 4:
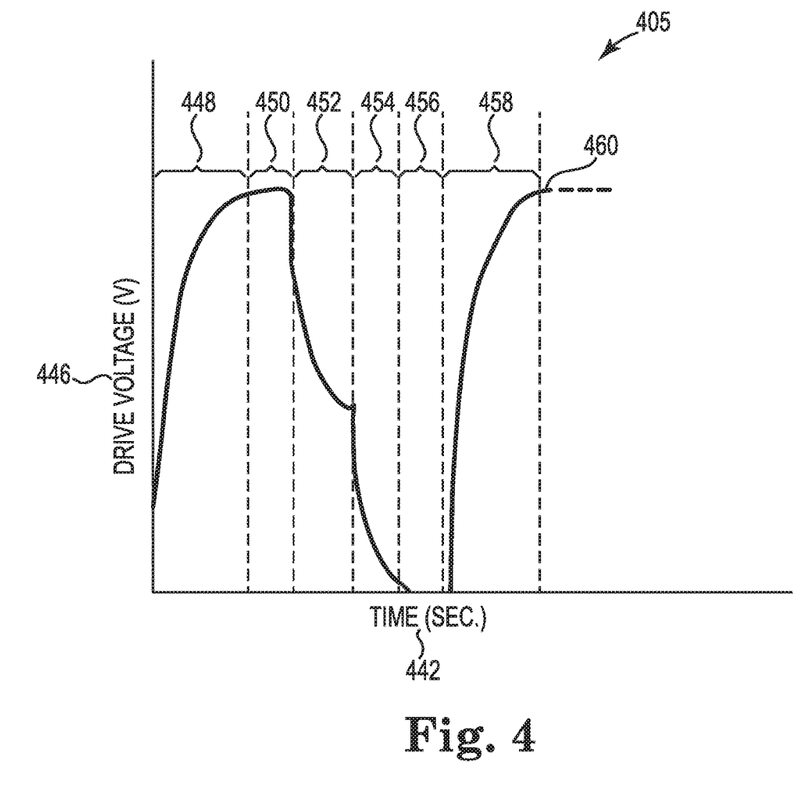
FIG. 4 illustrates an example utilizing a quench time to deionize a UV sensor tube in accordance with one or more embodiments of the present disclosure.

FIG. 4 illustrates a plotted graph 405 including drive voltage (v) 446 as compared to time (seconds) 442. Graph 405 illustrates the phases of a flame detection cycle performed by a controller of a UV sensor. As illustrated in FIG. 4, the detection cycle (e.g., monitoring a firing event, detecting UV emissions, and/or initiating a quench time) can include several phases.

Phase 448 (e.g., the first phase of the detection cycle) can be a charging phase. A voltage provided to the UV sensor can increase to a threshold and/or a predetermined voltage. The firing event (e.g., excitation voltage) can be supplied by an adjustable voltage supply, as previously discussed in relation to FIG. 3.

Phase 450 (e.g., the second phase) can be a holding, or an uncontrolled duration phase. The holding can include maintaining a constant voltage to the UV sensor to cause a quench, either natural or forced.

Phase 452 can include UV emissions detection and/or a natural quench. That is, the UV sensor can detect UV emission from a flame and naturally quench (e.g., deionization within the UV sensor tube).

Phase 454 can include a forced quench. That is, if the UV sensor does not initiate a natural quench prior to reaching a voltage threshold, a forced quench can occur. The forced quench can include deionization within the UV sensor tube, as described in relation to FIG. 3. The forced quench can prevent additional firings within the UV sensor for a predetermined period of time, as discussed in relation to FIG. 3.

Phase 456 can include a dwell. The dwell can indicate a period such that the firing event within the UV sensor has not reached a threshold at which to cause a quench. The voltage and/or the UV sensor can be static until a quench and/or a voltage changes.

Phase 458 can illustrate the re-charging of the UV sensor, initiating a repeat of cycle (e.g., phases 448-456).

By limiting the arc current (e.g., peak) 460 conducted during a detection event to the minimum detectable amount, which in turn lessens damage to the UV sensor tube. In addition, once a firing event (e.g., pulse, excitation voltage) is detected, a current flow can be terminated, greatly lessening the average current flow.

Figure 5:
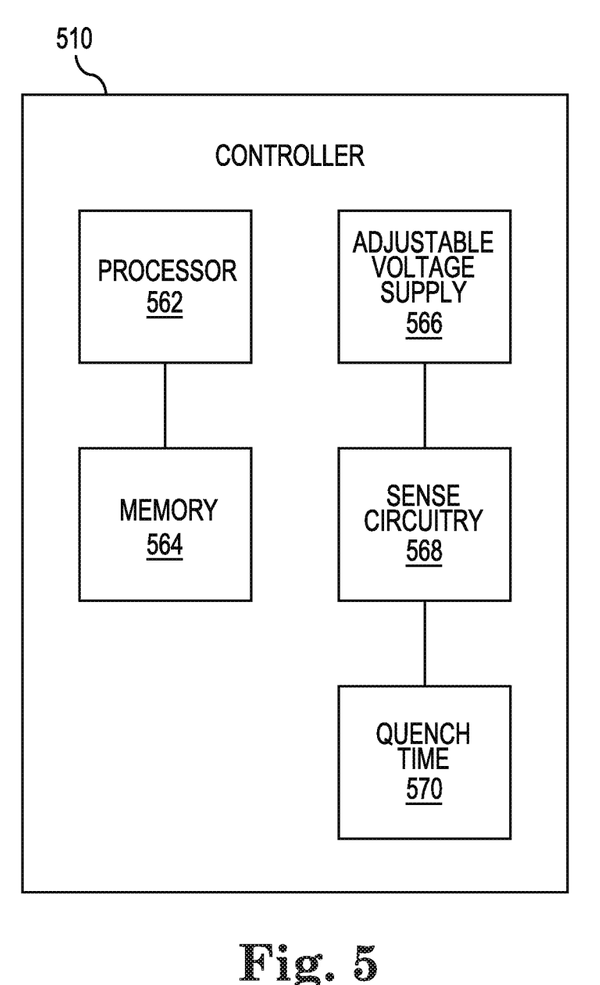
FIG. 5 is a schematic block diagram of a controller for utilizing a quench time to deionize a UV sensor tube, in accordance with one or more embodiments of the present disclosure.

FIG. 5 is a schematic block diagram of a controller 510 for utilizing a quench time of a UV sensor tube, in accordance with one or more embodiments of the present disclosure. Controller 510 can be, for example, controller 210 previously described in connection with FIG. 2. For example, controller 510 can include a memory 564 and a processor 562 configured to utilize a quench time of a UV sensor tube in accordance with the present disclosure. Further, controller 510 can include an adjustable voltage supply 566, sense circuitry 568, and quench time 570.

Adjustable voltage supply 566 can supply a firing event (e.g., excitation voltage) to a UV sensor (e.g., UV sensor 200 and 300 described in connection with FIGS. 2 and 3, respectively). For example, adjustable voltage supply 566 can supply a range of excitation voltages to a UV sensor (e.g., 0 volts to 12 volts). The excitation voltage (e.g., first firing event) can be monitored by the controller 510 to prevent a second firing event within the UV sensor.

Sense circuitry 568 can be circuitry that can sense UV emission. For example, sense circuitry 568 can determine a UV event has occurred when a UV sensor is in the presence of UV emissions.

Quench time 570 can be initiated after a first firing event. The quench time can prevent a second firing event (e.g., conduction, ionization within the UV sensor tube) from occurring for a predetermined period of time. That is, the quench time can cause a UV sensor to deionize the UV sensor tube and/or deionize before initiating a third (e.g., an additional) firing event.

The memory 564 can be any type of storage medium that can be accessed by the processor 562 to perform various examples of the present disclosure. For example, the memory 564 can be a non-transitory computer readable medium having computer readable instructions (e.g., computer program instructions) stored thereon that are executable by the processor 562 to disarm the UV sensor tube to prevent a firing event within the sensor tube for a predetermined period of time. That is, processor 562 can execute the executable instructions stored in memory 564 to decrease a firing event (e.g., an excitation voltage) at which a firing (e.g., conduction event, ionization within the UV sensor tube) may occur to reduce aging and/or damage to the UV sensor tube.

The memory 564 can be volatile or nonvolatile memory. The memory 564 can also be removable (e.g., portable) memory, or non-removable (e.g., internal) memory. For example, the memory 564 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 564 is illustrated as being located within controller 510, embodiments of the present disclosure are not so limited. For example, memory 564 can also be located internal to another computing resource (e.g., enabling computer readable instructions to be downloaded over the Internet or another wired or wireless connection).

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure. Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for utilizing a quench time to deionize an ultraviolet (UV) sensor tube, comprising:
   initiating a quench time to deionize a UV sensor tube; and
   disarming the UV sensor tube during the quench time to prevent a firing event.

2. The method of claim 1, wherein the method includes:
   monitoring firing events within the UV sensor tube; and
   initiating the quench time based, at least in part, on the monitoring.

3. The method of claim 1, wherein the method includes:
   initiating the quench time after a first firing event; and
   disarming the UV sensor tube during the quench time to prevent a second firing event.

4. The method of claim 1, wherein the method includes disarming the UV sensor tube during the quench time to prevent a firing event within the UV sensor tube.

5. The method of claim 1, wherein the method includes disarming the UV sensor tube by impeding a trap associated with the UV sensor tube for a predetermined period of time.

6. The method of claim 1, wherein the firing event is an excitation voltage within the UV sensor tube.

7. An ultraviolet (UV) sensor tube system, comprising:
a number of UV sensor tubes; and
a controller configured to initiate a quench time to deionize a respective one of the number of UV sensor tubes, wherein the quench time includes a disarming of that respective UV sensor tube to prevent a firing event within that respective UV sensor tube.

8. The UV sensor tube system of claim 7, wherein each of the number of UV sensor tubes include a fill-gas composition and two electrodes configured to detect UV emissions within that respective UV sensor tube.

9. The UV sensor tube system of claim 8, wherein the controller is configured to prevent a reduction in a pressure of the fill-gas composition of the respective one of the number of UV sensor tubes by initiating the quench time to deionize that respective UV sensor tube.

10. The UV sensor tube system of claim 8, wherein the controller is configured to prevent a change in a spacing between the two electrodes of the respective one of the number of UV sensor tubes by initiating the quench time to deionize that respective UV sensor tube.

11. The UV sensor tube system of claim 8, wherein the detected UV emissions are emitted from a flame produced a burner.

12. The UV sensor tube system of claim 7, wherein the controller is configured to:
receive a detected UV emission signal from the respective one of the number of UV sensor tubes; and
initiate the quench time based, at least in part, on the received signal.

13. The UV sensor tube system of claim 7, wherein the controller is configured to initiate the quench time based, at least in part, on a level of deionization associated with the respective one of the number of UV sensor tubes.

14. The UV sensor tube system of claim 7, wherein each of the number of UV sensor tubes is comprised of a glass material.

15. The UV sensor tube system of claim 7, wherein the controller is configured to trigger a firing event within the respective one of the number of UV sensor tubes once that respective UV sensor tube is deionized.

16. A controller for an ultraviolet (UV) sensor tube, comprising:
a memory; and
a processor configured to execute executable instructions stored in the memory to:
initiate a quench time for a UV sensor tube based, at least in part, on a level of deionization associated with the UV sensor tube; and
disarm the UV sensor tube during the quench time to prevent a firing event by impeding a trap associated with the UV sensor tube.

17. The controller of claim 16, wherein the processor is configured to execute the instructions to rearm the UV sensor tube after the quench time passes.

18. The controller of claim 16, wherein the processor is configured to execute the instructions to receive, from the UV sensor tube, a detected firing event.

19. The controller of claim 18, wherein the detected firing event causes a conduction event within the UV sensor tube.

20. The controller of claim 16, wherein the processor is configured to initiate the quench time for the UV sensor tube between firing cycles of the UV sensor tube.

* * * * *